US012691543B2

(12) United States Patent
    Kanazawa

(10) Patent No.: US 12,691,543 B2
(45) Date of Patent: Jul. 28, 2026

(54) MACHINE TOOL, MACHINE TOOL CONTROL METHOD, AND NON-TRANSITORY COMPUTER-READABLE MEDIUM COMPRISING MACHINE TOOL CONTROL PROGRAM

(71) Applicant: DMG MORI CO., LTD., Nara (JP)

(72) Inventor: Junichi Kanazawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 454 days.

(21) Appl. No.: 18/272,622

(22) PCT Filed: Jan. 17, 2022

(86) PCT No.: PCT/JP2022/001387
    § 371 (c)(1),
    (2) Date: Sep. 25, 2023

(87) PCT Pub. No.: WO2022/158420
    PCT Pub. Date: Jul. 28, 2022

(65) Prior Publication Data
    US 2024/0075574 A1 Mar. 7, 2024

(30) Foreign Application Priority Data
    Jan. 22, 2021 (JP) ................................. 2021-008826

(51) Int. Cl.
    *B23Q 11/10* (2006.01)
(52) U.S. Cl.
    CPC ................................. *B23Q 11/1069* (2013.01)
(58) Field of Classification Search
    CPC .............. B23Q 11/1069; B23Q 11/005; B23Q 17/007; G05B 19/406; G05B 2219/49049; Y02P 70/10
    See application file for complete search history.

(56) References Cited

U.S. PATENT DOCUMENTS

| 4,394,272 | A | 7/1983 | Damerau | |
| 10,518,374 | B2 * | 12/2019 | Matsuyama | ........... B65G 19/22 |
| 2018/0272488 | A1 | 9/2018 | Matsuyama et al. | |

FOREIGN PATENT DOCUMENTS

| CN | 211916281 | U | 11/2020 |
| JP | H03151009 | A | 6/1991 |

(Continued)

OTHER PUBLICATIONS

JP-2008267395-A_English translation (Year: 2008).*

(Continued)

*Primary Examiner* — Youngsul Jeong
(74) *Attorney, Agent, or Firm* — IP Business Solutions, LLC.

(57) ABSTRACT

There is provided a technique for more reliably detecting clogging of a filter with chips over conventional techniques. A machine tool that can machine a workpiece includes a storage tank; a discharge unit that discharges coolant stored in the storage tank toward chips resulting from the machining of the workpiece; a filter that removes the chips from the coolant; a collecting pump that brings the coolant back to the storage tank; a first obtaining unit that obtains a first index value indicating an amount of coolant discharged per predetermined time; a second obtaining unit that obtains a second index value indicating an amount of coolant that is brought back to the storage tank per predetermined time; and a notifying unit that notifies of an abnormality in the filter when a result of comparison of the first index value with the second index value satisfies a predetermined abnormality condition.

7 Claims, 12 Drawing Sheets

(56)     References Cited

FOREIGN PATENT DOCUMENTS

| JP | H10277323 | A | | 10/1998 | |
|----|-----------|---|---|---------|---|
| JP | 2006255833 | A | * | 9/2006 | ............. B23Q 11/00 |
| JP | 2008267395 | A | * | 11/2008 | ............. F15B 20/00 |
| JP | 2013253674 | A | * | 12/2013 | ............. F15B 20/00 |
| JP | 2016070407 | A | * | 5/2016 | ............. F15B 20/00 |
| JP | 2018161688 | A | | 10/2018 | |
| JP | WO2019189212 | A1 | * | 4/2021 | ............. B23Q 11/10 |
| WO | 2016031301 | A1 | | 3/2016 | |
| WO | 2019189212 | A | | 10/2019 | |

OTHER PUBLICATIONS

JP-2006255833-A_English translation (Year: 2006).*
JP-2013253674-A_English translation (Year: 2013).*
JP-2016070407-A_English translation (Year: 2016).*
JP WO 2019189212 A1_English translation (Year: 2019).*

* cited by examiner

CONTROL UNIT

AMOUNT OF
COOLANT
DISCHARGED
D(t)

51

FIRST
OBTAINING
UNIT

D(t)

54  RESULT
OF
DETERMINATION

DETERMINING
UNIT

56

NOTIFYING
UNIT

NORMAL/
ABNORMAL

AMOUNT OF
COOLANT
PASSING
THROUGH R(t)

52

SECOND
OBTAINING
UNIT

ALERT

144

FILTER OF CHIP CONVEYOR IS CLOGGED.

MACHINE TOOL, MACHINE TOOL CONTROL METHOD, AND NON-TRANSITORY COMPUTER-READABLE MEDIUM COMPRISING MACHINE TOOL CONTROL PROGRAM

TECHNICAL FIELD

The present disclosure relates to a technique for detecting an abnormality in a machine tool.

BACKGROUND ART

For a technique for removing chips resulting from machining of a workpiece by coolant, Japanese Patent Laying-Open No. 2018-161688 (PTL 1) discloses a "machine tool including a chip conveyor that more reliably prevents an overflow of coolant".

The machine tool has a float switch inside the chip conveyor. The float switch detects a liquid level of coolant collected by the chip conveyor, and when the liquid level is greater than or equal to a predetermined level, it is determined that an overflow of the coolant has occurred.

CITATION LIST

Patent Literature

PTL 1: Japanese Patent Laying-Open No. 2018-161688

SUMMARY OF INVENTION

Technical Problem

Coolant circulates inside the machine tool. More specifically, coolant is stored in a storage tank and discharged into the machine tool from the storage tank. By this, chips are removed from within the machine tool. The chips included in the coolant are removed using a filter provided in the machine tool. After removing the chips, the coolant is brought back to the above-described storage tank.

The above-described filter may be clogged with chips. When clogging of the filter occurs, coolant does not circulate in the machine tool.

The machine tool disclosed in the above-described PTL 1 determines whether clogging of the filter has occurred, based on the liquid level of coolant. Hence, when a large amount of coolant has been discharged into the machine tool, the machine tool may erroneously detect clogging of the filter.

The present disclosure is made to solve a problem such as that described above, and an object of a given aspect is to provide a technique for more reliably detecting clogging of a filter with chips over conventional techniques.

Solution to Problem

In an example of the present disclosure, a machine tool that can machine a workpiece includes: a storage tank that stores coolant; a discharge unit that discharges the coolant stored in the storage tank toward chips resulting from the machining of the workpiece; a filter that removes the chips from the coolant having been discharged toward the chips; a collecting pump that brings the coolant having passed through the filter back to the storage tank; a first obtaining unit that obtains a first index value indicating an amount of coolant discharged from the discharge unit per predetermined time; a second obtaining unit that obtains a second index value indicating an amount of coolant that passes through the filter and is brought back to the storage tank per the predetermined time; and a notifying unit that notifies of an abnormality in the filter when a result of comparison of the first index value with the second index value satisfies a predetermined abnormality condition.

In an example of the present disclosure, the machine tool further includes a display unit. The notifying unit displays, on the display unit, an alert indicating occurrence of clogging of the filter with the chips.

In an example of the present disclosure, the predetermined abnormality condition is satisfied when a difference value of the first index value from the second index value exceeds a predetermined value.

In an example of the present disclosure, the machine tool further includes a collecting tank that receives the coolant having passed through the filter.

In an example of the present disclosure, the discharge unit includes: a coolant nozzle; and a discharge pump that sends the coolant to the coolant nozzle from the storage tank. The collecting pump sends the coolant from the collecting tank to the storage tank.

In an example of the present disclosure, the first index value includes a drive frequency of a motor for driving the discharge pump. The second index value includes a drive frequency of a motor for driving the collecting pump.

In another example of the present disclosure, there is provided a control method for a machine tool that can machine a workpiece. The machine tool includes: a storage tank that stores coolant; a discharge unit that discharges the coolant stored in the storage tank toward chips resulting from the machining of the workpiece; a filter that removes the chips from the coolant having been discharged toward the chips; and a collecting pump that brings the coolant having passed through the filter back to the storage tank. The control method includes: obtaining a first index value indicating an amount of coolant discharged from the discharge unit per predetermined time; obtaining a second index value indicating an amount of coolant that passes through the filter and is brought back to the storage tank per the predetermined time; and notifying of an abnormality in the filter when a result of comparison of the first index value with the second index value satisfies a predetermined abnormality condition.

In another example of the present disclosure, there is provided a control program for a machine tool that can machine a workpiece. The machine tool includes a storage tank that stores coolant; a discharge unit that discharges the coolant stored in the storage tank toward chips resulting from the machining of the workpiece; a filter that removes the chips from the coolant having been discharged toward the chips; and a collecting pump that brings the coolant having passed through the filter back to the storage tank. The control program causes the machine tool to perform: obtaining of a first index value indicating an amount of coolant discharged from the discharge unit per predetermined time, obtaining of a second index value indicating an amount of coolant that passes through the filter and is brought back to the storage tank per the predetermined time; and notifying of an abnormality in the filter when a result of comparison of the first index value with the second index value satisfies a predetermined abnormality condition.

The above-described and other objects, features, aspects, and advantages of the present invention will become clear from the following detailed description of the present invention to be understood in conjunction with the accompanying drawings.

BRIEF DESCRIPTION OF DRAWINGS

FIG. 2 is a diagram showing a state of the inside of the machine tool.

FIG. 10 is a diagram showing an example of a mode of notification provided by a notifying unit.

DESCRIPTION OF EMBODIMENTS

With reference to the drawings, each embodiment according to the present invention will be described below. In the following description, the same parts and components are given the same reference signs. The names and functions of those parts and components are also the same. Thus, a detailed description of those parts and components is not repeated. Note that embodiments and variants that are described below may be selectively combined together as appropriate.

<A. Outward Appearance of Machine Tool 100>

Figure 1:
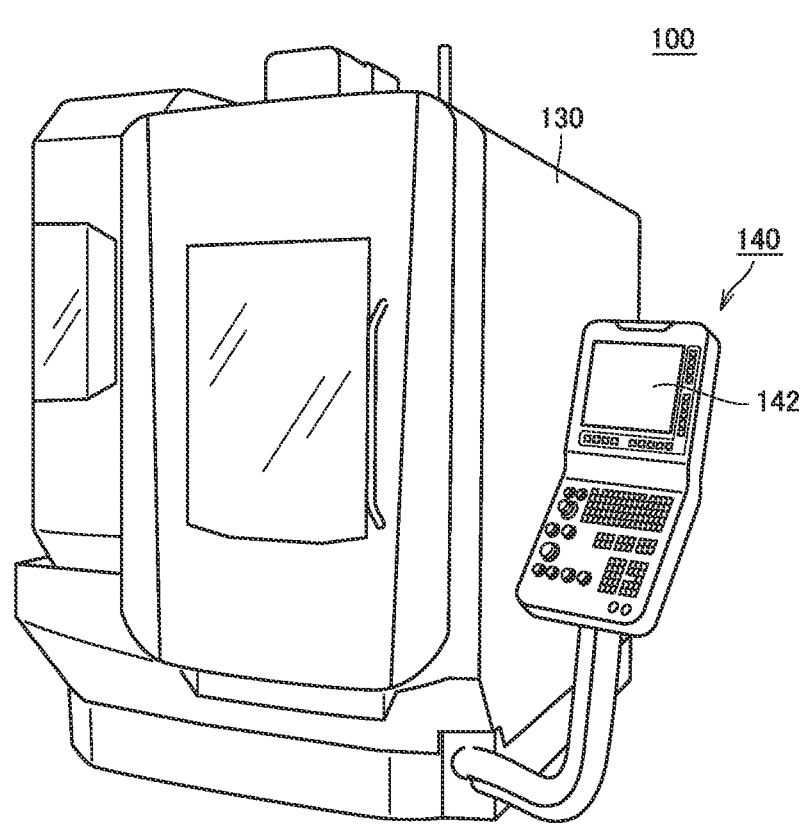
FIG. 1 is a diagram showing an outward appearance of a machine tool.

With reference to FIG. 1, a machine tool 100 according to an embodiment will be described. FIG. 1 is a diagram showing an outward appearance of machine tool 100.

A "machine tool" referred to in this specification is a concept including various apparatuses having a function of machining a workpiece In this specification, as an example of machine tool 100, a horizontal machining center will be described as an example, but machine tool 100 is not limited thereto. For example, machine tool 100 may be a vertical machining center. Alternatively, machine tool 100 may be a lathe or may be an additional processing machine or may be other machines such as a cutting machine or a grinding machine. Furthermore, machine tool 100 may be a multi-tasking machine in which those machines are combined together.

As shown in FIG. 1, machine tool 100 includes a cover 130 and a control panel 140. Cover 130 is also called a splash guard, and forms an outward appearance of machine tool 100 and sections off and forms a work area AR for a workpiece W (see FIG. 2).

Control panel 140 is a general-purpose computer and has a display 142 for displaying various types of information about machining. Display 142 is, for example, a liquid crystal display, an organic electroluminescence (EL) display, or other display devices. In addition, display 142 includes a touch panel and receives various operations for machine tool 100 by touch operations.

<B. Internal Configuration of Machine Tool 100>

Figure 2:
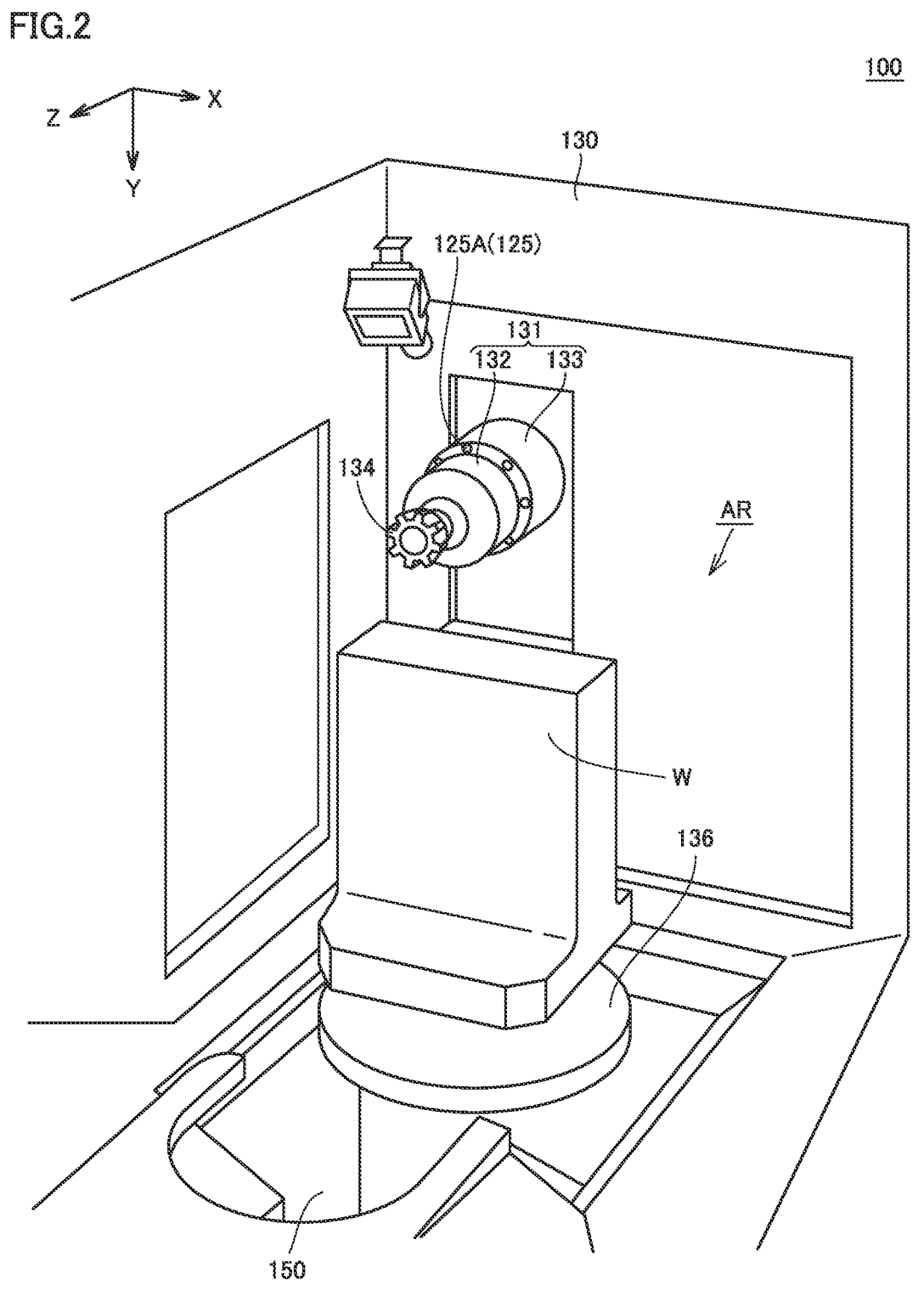
Figure 3:
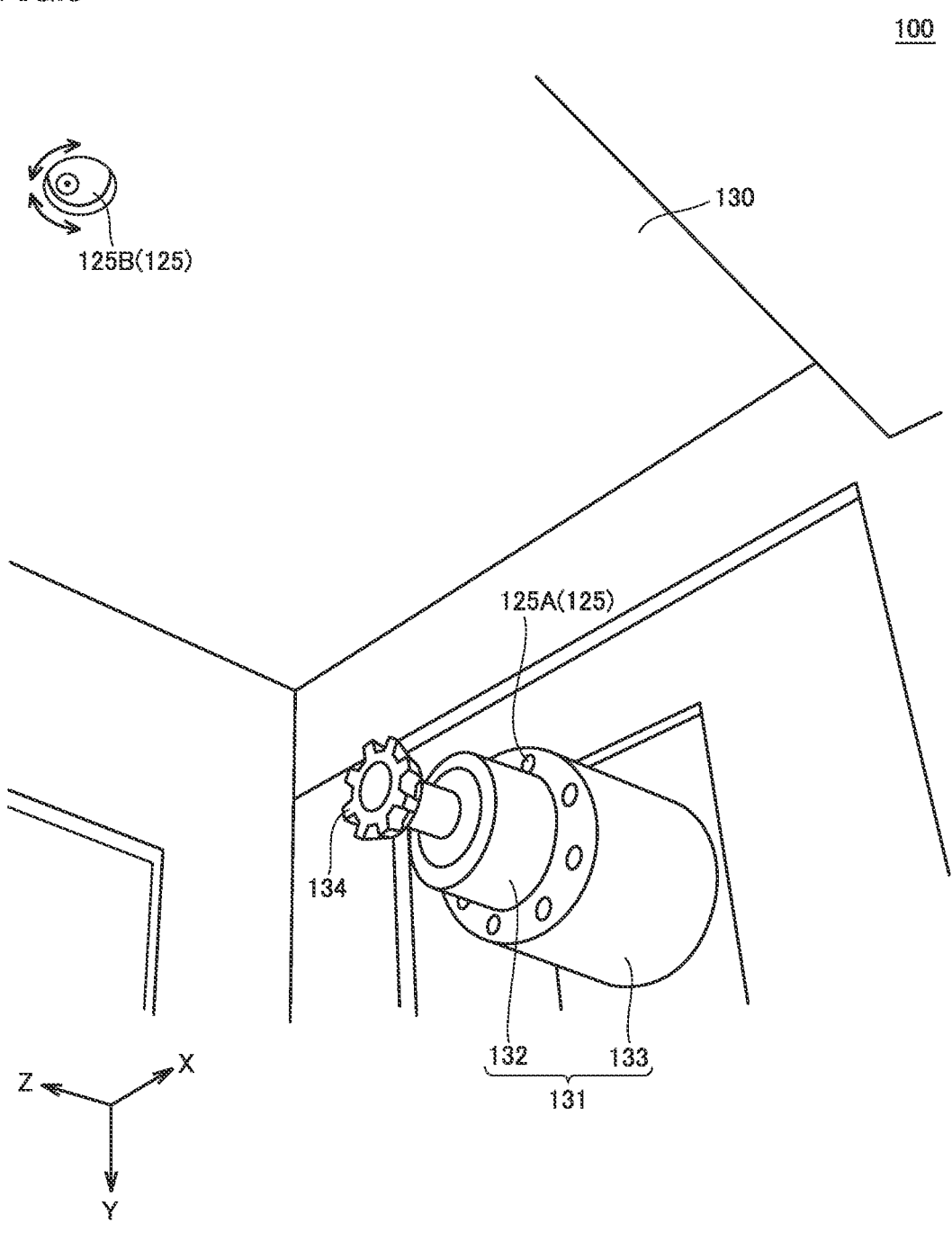
FIG. 3 is a diagram showing a state of the inside of the machine tool in a different direction from that of FIG. 2.

Next, with reference to FIGS. 2 and 3, an internal configuration of machine tool 100 will be described. FIG. 2 is a diagram showing a state of the inside of machine tool 100. FIG. 3 is a diagram showing a state of the inside of machine tool 100 in a different direction from that of FIG. 2.

As shown in FIGS. 2 and 3, machine tool 100 includes therein a discharge unit 125 for coolant, a spindle head 131, a tool 134, a table 136, and a chip conveyor 150. Spindle head 131 includes a main spindle 132 and a housing 133.

For convenience of description, in the following description, the axial direction of main spindle 132 is also referred to as "Z-axis direction". The direction of gravitational force is also referred to as "Y-axis direction". A direction orthogonal to both the Y-axis direction and the Z-axis direction is referred to as "X-axis direction".

Discharge unit 125 is provided in machine tool 100 and discharges coolant to drain chips resulting from machining of workpiece W into chip conveyor 150. Discharge unit 125 includes one or more discharge mechanisms. In FIGS. 2 and 3, as an example of discharge unit 125, discharge mechanisms 125A and 125B are shown.

Discharge mechanism 125A is provided on spindle head 131. Discharge mechanism 125A may be of a side-through type in which coolant is discharged from a main spindle end face through housing 133 of spindle head 131, or may be a center-through type in which coolant is discharged from a cutting edge of a tool held in spindle head 131 through the center of the main spindle of spindle head 131. Discharge mechanism 125A mainly aims at removing chips attached to main spindle 132 and tool 134 or suppressing heat generation at a work point of a workpiece, by discharging coolant to the work point of the workpiece. Discharge mechanism 125A is configured to be able to be driven in a rotational direction with the X-axis direction being a rotational axis (i.e., an A-axis direction) and is configured to be able to be driven in a rotational direction with the Z-axis direction being a rotational axis (i.e., a C-axis direction). By this, the discharge mechanism 125A changes the discharge direction of coolant in the A-axis direction and the C-axis direction.

Discharge mechanism 125B is provided at an upper position than discharge mechanism 125A. Discharge mechanism 125B is mounted, for example, on a ceiling portion of cover 130. Discharge mechanism 125B mainly aims at draining chips resulting from machining of workpiece W into chip conveyor 150 from within work area AR by supplying coolant to entire work area AR from cover 130.

Main spindle 132 is provided inside housing 133. A tool for machining workpiece W which is a piece of work to be machined is mounted on main spindle 132. In an example of FIGS. 2 and 3, tool 134 used to mill workpiece W is mounted on main spindle 132.

Chip conveyor 150 for chips is a mechanism for draining chips resulting from machining of workpiece W out of work area AR. Details of chip conveyor 150 will be described later.

<C. Drive Mechanisms of Machine Tool 100>

Figure 4:
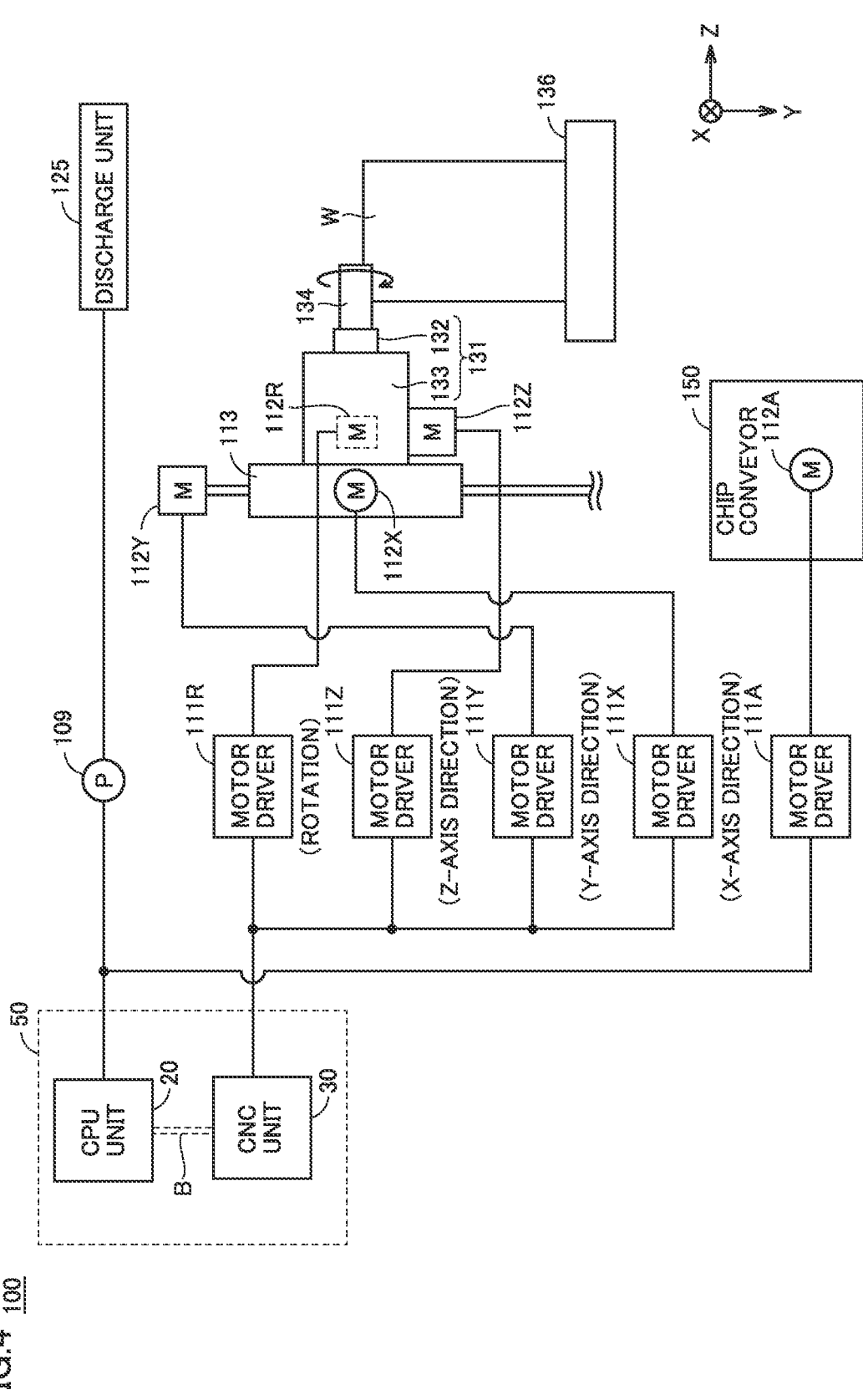
FIG. 4 is a diagram showing an exemplary configuration of drive mechanisms of the machine tool.

Next, with reference to FIG. 4, various drive mechanisms of machine tool 100 will be described. FIG. 4 is a diagram showing an exemplary configuration of drive mechanisms of machine tool 100.

As shown in FIG. 4, machine tool 100 includes a control unit 50, a discharge pump 109, motor drivers 111A, 111R, and 111X to 111Z, motors 112A, 112R, and 112X to 112Z, a moving body 113, discharge mechanisms 125A and 125B, spindle head 131, tool 134, and table 136.

"Control unit 50" referred to in this specification indicates an apparatus that controls machine tool 100. Control unit 50 may have any apparatus configuration. Control unit 50 may include a single control unit or may include a plurality of control units. In an example of FIG. 4, control unit 50 includes a CPU unit 20 serving as a programmable logic controller (PLC); and a computer numerical control (CNC) unit 30. CPU unit 20 and CNC unit 30 communicate with each other through a communication path B (e.g., a fieldbus or a LAN cable).

CPU unit 20 controls various units included in machine tool 100, according to a PLC program designed in advance. The PLC program is written, for example, in the form of a ladder program.

As an example, CPU unit 20 controls discharge pump 109 according to the PLC program to control discharge of coolant by discharge unit 125. By this, the on and off of discharge of coolant, the amount of coolant discharged, and the like, are controlled.

As another example, CPU unit 20 controls motor driver 111A according to the PLC program. Motor driver 111A receives input of a target rotational speed of motor 112A from CPU unit 20, thereby controlling motor 112A. By this, the on and off of drive of chip conveyor 150, the chip conveying speed of chip conveyor 150, and the like, are controlled. Note that motor 112A may be an alternating current motor or may be a stepper motor or may be a servomotor or may be other types of motors.

Based on reception of a machining start instruction from CPU unit 20, CNC unit 30 starts execution of a machining program designed in advance. The machining program is written, for example, in the form of a numerical control (NC) program. CNC unit 30 controls motor drivers 111R and 111X to 111Z according to the machining program, to machine workpiece W fixed on table 136.

Motor driver 111R sequentially receives input of a target rotational speed from CNC unit 30, thereby controlling motor 112R. Motor 112R rotationally drives main spindle 132 about the Z-axis direction. Motor 112R may be an alternating current motor or may be a stepper motor or may be a servomotor or may be other types of motors.

When motor 112R is a servomotor, motor driver 111R calculates an actual rotational speed of motor 112R from a feedback signal of an encoder (not shown) for detecting an angle of rotation of motor 112R. Then, when the calculated actual rotational speed is lower than a target rotational speed, motor driver 111R increases the rotational speed of motor 112R, and when the calculated actual rotational speed is higher than the target rotational speed, motor driver 111R reduces the rotational speed of motor 112R. As such, while motor driver 111R sequentially receives feedback on the rotational speed of motor 112R, motor driver 111R approximates the rotational speed of motor 112R to the target rotational speed.

Motor driver 111X sequentially receives input of a target position from CNC unit 30, thereby controlling motor 112X. Motor 112X feed-drives, through a ball screw (not shown), moving body 113 having spindle head 131 mounted thereon, to move main spindle 132 to any position in the X-direction. A method of controlling motor 112X by motor driver 111X is the same as that for motor driver 111R, and thus, description thereof is not repeated. Note that motor 112X may be an alternating current motor or may be a stepper motor or may be a servomotor or may be other types of motors.

Motor driver 111Y sequentially receives input of a target position from CNC unit 30, thereby controlling motor 112Y. Motor 112Y feed-drives, through a ball screw (not shown), moving body 113 having spindle head 131 mounted thereon, to move main spindle 132 to any position in the Y-direction.

A method of controlling motor 112Y by motor driver 111Y is the same as that for motor driver 111R, and thus, description thereof is not repeated. Note that motor 112Y may be an alternating current motor or may be a stepper motor or may be a servomotor or may be other types of motors.

Motor driver 111Z sequentially receives input of a target position from CNC unit 30, thereby controlling motor 112Z. Motor 112Z feed-drives, through a ball screw (not shown), moving body 113 having spindle head 131 mounted thereon, to move main spindle 132 to any position in the Z-direction. A method of controlling motor 112Z by motor driver 111Z is the same as that for motor driver 111R and thus, description thereof is not repeated. Note that motor 112Z may be an alternating current motor or may be a stepper motor or may be a servomotor or may be other types of motors.

<D. Configuration of Chip Conveyor 150>

Figure 5:
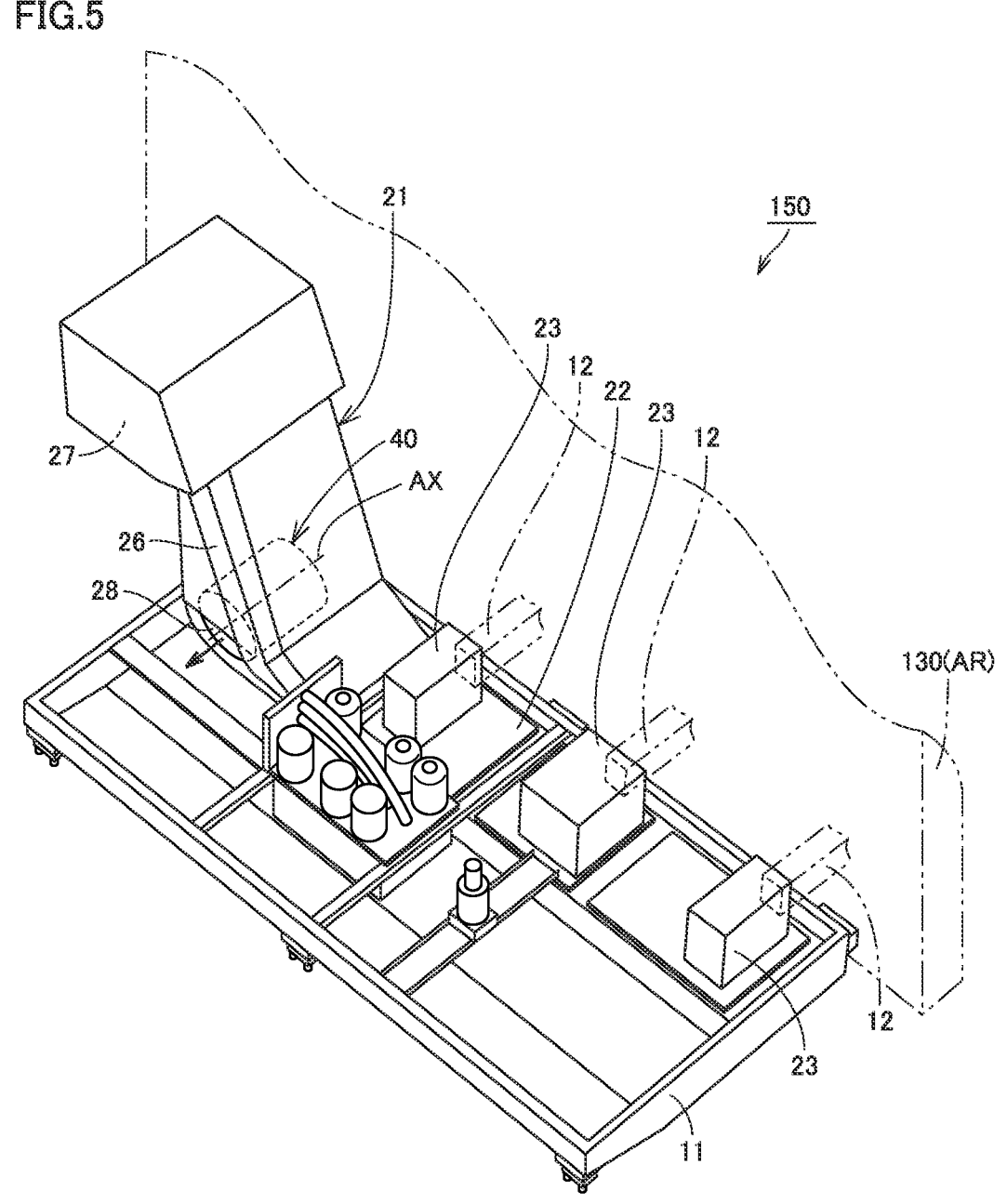
FIG. 5 is a diagram showing an outward appearance of a chip conveyor.
Figure 6:
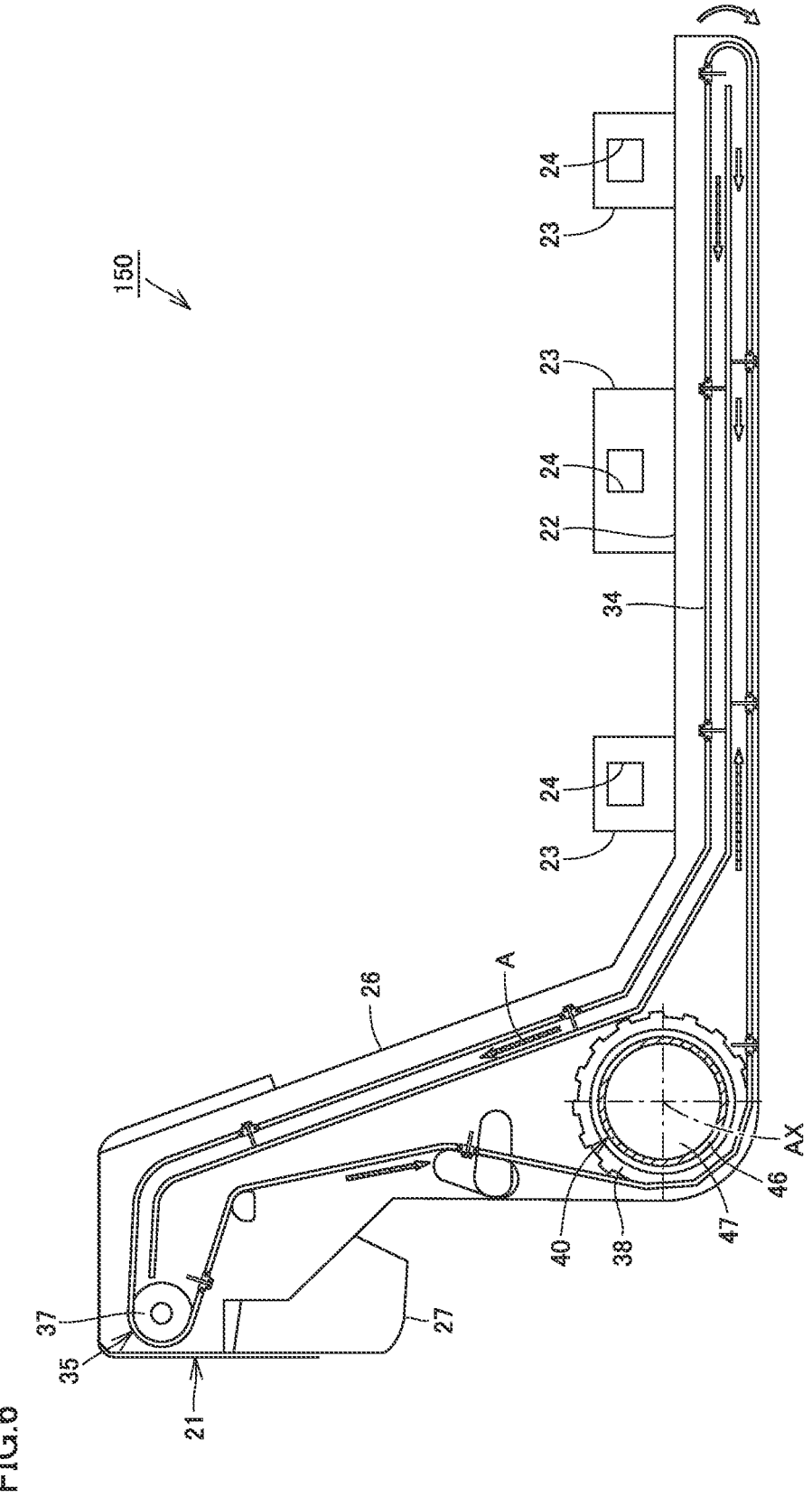
FIG. 6 is a diagram showing a cross-section of the chip conveyor.

Next, with reference to FIGS. 5 and 6, chip conveyor 150 included in machine tool 100 will be described. FIG. 5 is a diagram showing an outward appearance of chip conveyor 150 FIG. 6 is a diagram showing a cross-section of chip conveyor 150.

Chip conveyor 150 is placed attached to cover 130 that sections off and forms work area AR. Chip conveyor 150 receives workpiece chips and coolant that are drained from work area AR.

Chip conveyor 150 has a collecting tank 11. Collecting tank 11 is configured to be able to store coolant. Chip conveyor 150 conveys chips toward a chip bucket (not shown), and filters coolant, thereby draining clean coolant into collecting tank 11.

Chip conveyor 150 further has a cover body 21. Cover body 21 forms an outward appearance of chip conveyor 150. Cover body 21 has a casing form having space formed inside thereof.

Cover body 21 has, as its components, a horizontal unit 22, a rising unit 26, chip receiving units 23, and a chip draining unit 27.

Cover body 21 overall has a bending shape between horizontal unit 22 and rising unit 26. Horizontal unit 22 is placed in collecting tank 11. Horizontal unit 22 has a plate-shaped outward appearance that extends in a horizontal direction. Horizontal unit 22 has a rectangular-shaped plan view. Rising unit 26 rises from one end in a longitudinal direction of horizontal unit 22 and extends in a diagonally upward direction.

Chip receiving units 23 are provided on horizontal unit 22. Chip receiving units 23 each are formed of a casing provided on a top face of horizontal unit 22. Chip receiving units 23 each are provided with a connection opening 24. Connection opening 24 is formed of a through hole that passes through chip receiving unit 23. A chip conveying apparatus 12 which is equipment in work area AR is connected to chip receiving unit 23 through connection opening 24. Chip conveying apparatus 12 is configured to include, for example, a gutter body extending in one direction and a spiral conveyor placed in the gutter body.

Chip draining unit 27 is provided at an end portion of rising unit 26 that extends from horizontal unit 22 in the diagonally upward direction. Chip draining unit 27 is formed of an opening portion of cover body 21 that opens in a vertically downward direction. A chip bucket (not shown) for collecting chips is placed below chip draining unit 27. Workpiece chips drained from work area AR are received by chip receiving units 23 into cover body 21. The chips are conveyed within cover body 21 by a chip conveying mechanism which is subsequently described, and are drained through chip draining unit 27, by which the chips are collected in the chip bucket.

Chip conveyor 150 further has a chip conveying unit 35. Chip conveying unit 35 is accommodated in cover body 21. Chip conveying unit 35 is an apparatus for conveying chips within cover body 21.

A more specific description will be made. Chip conveying unit 35 has a pair of endless chains 34, a drive sprocket 37, and a driven sprocket 38.

Drive sprocket 37 is provided at the end portion of rising unit 26 that extends from horizontal unit 22 in the diagonally upward direction. Drive sprocket 37 is disposed above chip draining unit 27. Drive sprocket 37 is supported so as to be rotatable about an axis extending in a direction orthogonal to a plane of paper showing FIG. 6 (hereinafter, the direction is also referred to as "width direction of chip conveyor 150"). An output shaft of aforementioned motor 112A (see FIG. 4) is coupled to drive sprocket 37. Drive sprocket 37 rotates by power transmitted thereto from motor 112A.

Driven sprocket 38 is provided at a bending unit between horizontal unit 22 and rising unit 26. Driven sprocket 38 is supported so as to be rotatable about an axis (central axis AX) extending in the width direction of chip conveyor 150.

Pair of endless chains 34 is disposed in parallel in the width direction of chip conveyor 150, with a distance therebetween. Endless chains 34 are routed in a loop inside cover body 21 and across horizontal unit 22 and rising unit 26. Endless chains 34 are routed inside cover body 21 such that endless chains 34 move back and forth between a location facing chip receiving units 23 and a location facing chip draining unit 27.

Endless chains 34 are wrapped around drive sprocket 37 and driven sprocket 38 on a path where endless chains 34 are routed in cover body 21, and are guided by a plurality of guide members. When drive sprocket 37 rotates by receiving power from motor 112A, endless chains 34 rotate in directions indicated by arrows A (hatched arrows) in FIG. 6.

Chip conveyor 150 further has a filtering mechanism 40. Filtering mechanism 40 is configured to filter coolant received from work area AR, thereby draining clean coolant into collecting tank 11 from within cover body 21.

A more specific description will be made. Filtering mechanism 40 has a filter 46 in a drum shape. Filter 46 is accommodated in cover body 21. Filter 46 is provided at the bending unit between horizontal unit 22 and rising unit 26. Filter 46 is configured to be able to catch foreign matter such as chips included in coolant. Filter 46 has, for example, a cylindrical shape and forms internal space 47 on an inner side thereof.

Filter 46 in a drum shape is disposed such that a central axis thereof extends in the width direction of chip conveyor 150. Filter 46 is disposed such that the central axis thereof coincides with central axis AX which is the center of rotation of driven sprocket 38. Filter 46 is connected to driven sprocket 38 at its both ends in an axial direction of central axis AX.

Note that although the above description is made of filter 46 in a drum shape, the shape of filter 46 is not limited to the drum shape. As an example, the shape of filter 46 may be rectangular or may be circular.

A coolant draining unit 28 is formed in cover body 21. Coolant draining unit 28 is formed of a through hole that passes through cover body 21. Coolant draining unit 28 is provided such that internal space 47 of filter 46 communicates with external space on an outer side of cover body 21. Coolant received into cover body 21 through chip receiving units 23 is filtered by entering internal space 47 of filter 46. The filtered coolant is drained into collecting tank 11 through coolant draining unit 28.

<E. Coolant Circulation Mechanism>

Figure 7:
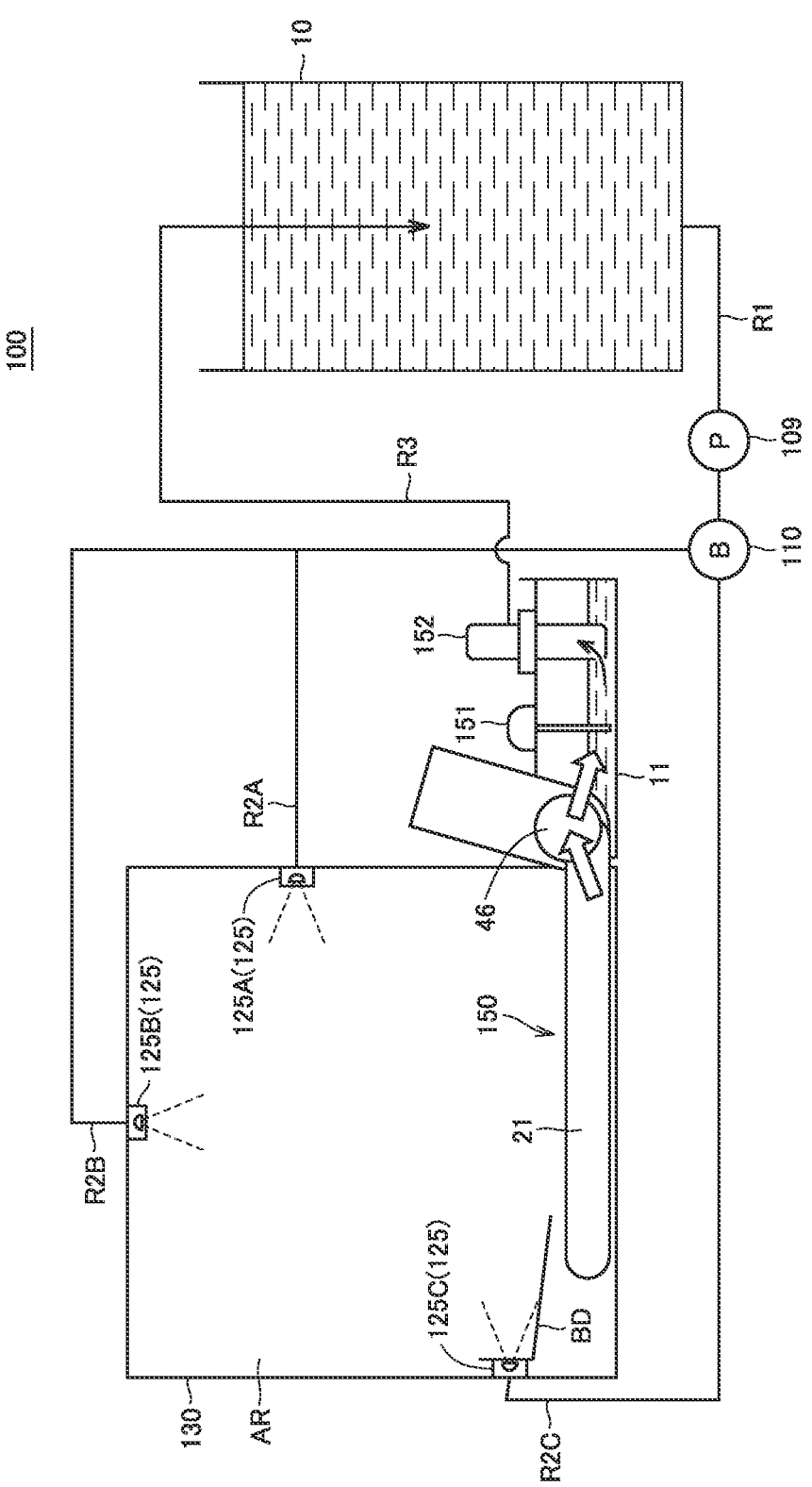
FIG. 7 is a diagram showing an example of a coolant circulation mechanism.

Next, with reference to FIG. 7, a coolant circulation mechanism will be described. FIG. 7 is a diagram showing an example of a coolant circulation mechanism.

Coolant discharged from discharge unit 125 circulates in machine tool 100. Machine tool 100 includes, as components of the coolant circulation mechanism, a storage tank 10, discharge pump 109, a valve 110, discharge unit 125, chip conveyor 150, a liquid level sensor 151, a collecting pump 152, and passages R1, R2A to R2C, and R3. Discharge unit 125 includes, for example, discharge mechanisms 125A to 125C.

Storage tank 10 stores therein coolant. Storage tank 10 is connected to one end of passage R1. The other end of passage R1 is connected to passages R2A to R2C.

Passage R2A is connected to discharge mechanism 125A. Discharge mechanism 125A has, for example, a coolant nozzle (not shown) connected to passage R2A, and discharges coolant pumped through passage R2A toward spindle head 131 from the coolant nozzle. By this, workpiece chips attached to spindle head 131 are drained into chip conveyor 150.

Passage R2B is connected to discharge mechanism 125B. Discharge mechanism 125B discharges coolant pumped through passage R2B toward entire work area AR. By this, workpiece chips present in work area AR are drained into chip conveyor 150.

Passage R2C is connected to discharge mechanism 125C. Discharge mechanism 125A discharges coolant pumped through passage R2A toward a wall surface of abed BD. By this, chips accumulated on bed BD are drained into chip conveyor 150.

Discharge pump 109 pumps, by being driven, the coolant stored in storage tank 10 to each of passages R2A to R2C through passage R1. By this, discharge pump 109 sends the coolant from storage tank 10 to a coolant nozzle of discharge unit 125.

Valve 110 is provided, for example, at passages R1 and R2A to R2C. Valve 110 is a control valve that controls the flow rate of coolant that is pumped from storage tank 10 to discharge mechanisms 125A to 125C. Valve 110 is controlled by aforementioned control unit 50. Note that valve 110 may be integrally formed with discharge pump 109 or may be formed separately.

Chip conveyor 150 has collecting tank 11 and filter 46. Filter 46 is configured to be able to catch foreign matter such as chips included in coolant. Coolant from which chips are removed by filter 46 is drained into collecting tank 11 from within cover body 21 of chip conveyor 150. As such, collecting tank 11 is configured to receive coolant having passed through filter 46.

Liquid level sensor 151 detects the height of the liquid level of coolant accumulated in collecting tank 11. The detected height is outputted to aforementioned control unit 50. Control unit 50 adjusts the amount of coolant pumped up by collecting pump 152 such that the height is constant.

Collecting pump 152 is connected to passage R3 Collecting pump 152 pumps up coolant having passed through filter 46 and having been accumulated in collecting tank 11, and brings the coolant back to storage tank 10 through passage R3 By this, storage tank 10 sends the coolant from collecting tank 11 to storage tank 10.

<F. Overview>

Subsequently, with reference to FIG. 7, an overview of a method of detecting clogging of filter 46 will be described.

As described above, coolant discharged into work area AR passes through filter 46 and is drained into collecting tank 11 from within cover body 21 of chip conveyor 150. In this process, filter 46 removes chips from the coolant. Upon the removal, if clogging of filter 46 has occurred, then the coolant does not circulate in machine tool 100. Hence, machine tool 100 detects clogging of filter 46, and when the clogging has occurred, machine tool 100 notifies of an abnormality in filter 46.

More specifically, when clogging of filter 46 has occurred, coolant cannot pass through filter 46, and thus, the amount of coolant collected is small relative to the amount of coolant discharged. With this in view, machine tool 100 obtains a first index value indicating the amount of coolant discharged from discharge unit 125 per predetermined time and a second index value indicating the amount of coolant that passes through filter 46 and is brought back to storage tank 10 per predetermined time. A specific example of the first index value and the second index value will be described later.

Thereafter, when a result of comparison of the first index value with the second index value satisfies a predetermined abnormality condition, machine tool 100 notifies of an abnormality in filter 46. Machine tool 100 determines whether the amount of coolant collected relative to the amount of coolant discharged is smaller than a predetermined amount, by determining whether the abnormality condition is satisfied. A specific example of the abnormality condition will be described later.

As such, by taking notice of the amount of coolant collected relative to the amount of coolant discharged, machine tool 100 detects clogging of filter 46. By this, machine tool 100 can detect clogging of filter 46 regardless of whether the amount of coolant discharged is small or large.

<G. Functional Components>

Figure 8:
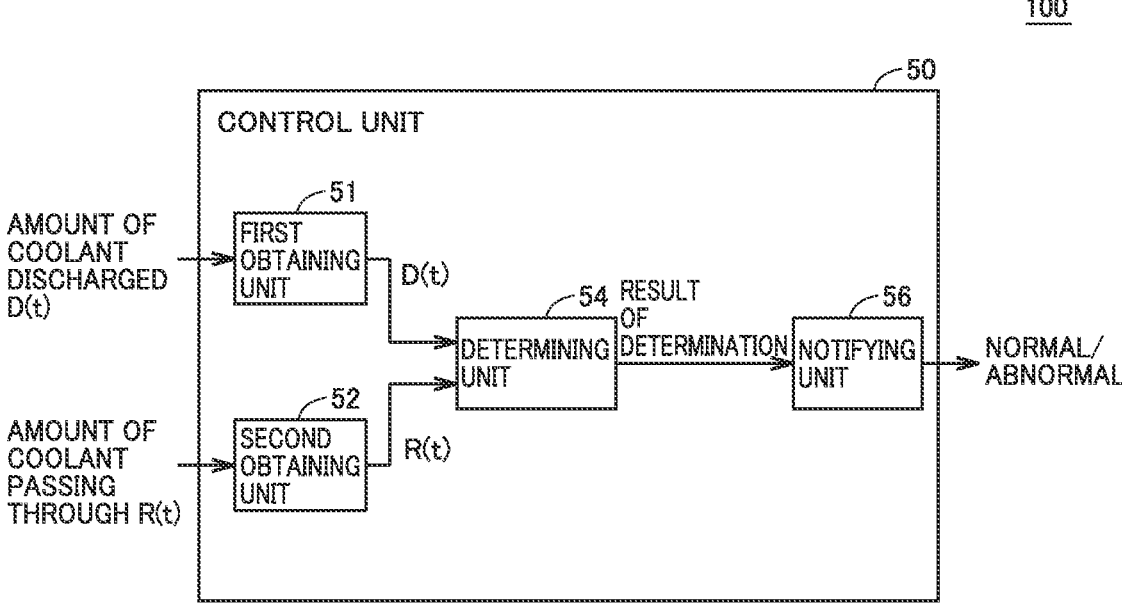
FIG. 8 is a diagram showing an example of functional components of the machine tool 100.

Next, with reference to FIG. 8, functional components of machine tool 100 will be described. FIG. 8 is a diagram showing an example of functional components of machine tool 100.

Control unit 50 of machine tool 100 includes, as an example of functional components, a first obtaining unit 51, a second obtaining unit 52, a determining unit 54, and a notifying unit 56. The following describes these functional components in turn.

Note that first obtaining unit 51 may be mounted on CPU unit 20 (see FIG. 4) or may be mounted on CNC unit 30 (see FIG. 4). Likewise, second obtaining unit 52 may be mounted on CPU unit 20 or may be mounted on CNC unit 30. Likewise, determining unit 54 may be mounted on CPU unit 20 or may be mounted on CNC unit 30. Likewise, notifying unit 56 may be mounted on CPU unit 20 or may be mounted on CNC unit 30.

(G1. First Obtaining Unit 51)

First, with reference to the aforementioned FIG. 7, a function of first obtaining unit 51 shown in FIG. 8 will be described.

First obtaining unit 51 obtains an index value D(t) (first index value) indicating the amount of coolant discharged from discharge unit 125 per predetermined time. The length of the predetermined time may be determined in advance upon designing a program, etc., or may be arbitrarily set by a user. As an example, the length of the predetermined time is about 1 to 10 minutes.

The index value D(t) is data obtained by averaging or adding up, on a per certain section (unit time) basis, time-series data on the amount of coolant discharged from discharge unit 125. The index value D(t) can include various physical quantities correlated with the amount of coolant discharged. Typically, the index value D(t) is detected using various sensors provided on a more upstream side than filter 46. The following describes specific examples of the index value D(t).

(a) Specific Example 1 of the Index Value D(t)

As an example, the index value D(t) includes output to discharge pump 109. More specifically, discharge pump 109 has a motor (not shown). The amount of coolant discharged from discharge unit 125 is adjusted based on the frequency of alternating current outputted to the motor (hereinafter, also referred to as "drive frequency"). Typically, the higher the drive frequency, the larger the amount of coolant discharged, and the lower the frequency of the drive frequency, the smaller the amount of coolant discharged. As such, the amount of coolant discharged is correlated with the drive frequency outputted to discharge pump 109. Hence, the drive frequency of discharge pump 109 can be the index value D(t).

(b) Specific Example 2 of the Index Value D(t)

As another example, the index value D(t) includes an output value of a liquid level sensor (not shown) provided on a more upstream side than filter 46. The liquid level sensor is provided, for example, inside cover body 21 of chip conveyor 150 and detects the height of the liquid level of coolant accumulated in cover body 21. The height may be represented by a distance from the bottom of cover body 21 to the liquid level of coolant or may be represented by a distance from the liquid level of coolant to the liquid level sensor. The height of the liquid level is correlated with the amount of coolant discharged from discharge unit 125. More specifically, the larger the amount of coolant discharged, the higher the liquid level, and the smaller the amount of coolant discharged, the lower the liquid level. Hence, the height of the liquid level of coolant in cover body 21 can be the index value D(t).

(c) Specific Example 3 of the Index Value D(t)

As another example, the index value D(t) includes an output value of a flowmeter (not shown) included in machine tool 100. The flowmeter detects a flow rate of coolant before passing through filter 46. The flowmeter is provided, for example, in a passage present on a more upstream side than filter 46. Namely, coolant discharged from discharge unit 125 passes through the passage and then passes through filter 46. Hence, the larger the amount of coolant discharged, the larger the output value of the flowmeter, and the smaller the amount of coolant discharged, the smaller the output value of the flowmeter. As such, the output value of the flowmeter is correlated with the amount of coolant discharged and thus can be the index value D(t).

(d) Specific Example 4 of the Index Value D(t)

As another example, the index value D(t) includes a value indicating a machining mode of machine tool 100. The frequency of alternating current outputted to the motor of discharge pump 109 is changed depending on the machining mode of machine tool 100. More specifically, the output frequency is determined in advance for each machining mode, and machine tool 100 changes the machining mode according to a machining program. As such, the machining mode of machine tool 100 is correlated with the amount of coolant discharged and thus can be the index value D(t).

(e) Specific Example 5 of the Index Value D(t)

As another example, the index value D(t) includes an output value of a mist sensor (not shown) included in machine tool 100. The mist sensor is provided, for example, in work area AR in machine tool 100 and detects the amount of mist in air. The mist sensor is, for example, a photosensor The amount of mist in work area AR increases as the amount of coolant discharged from discharge unit 125 increases. Hence, the larger the amount of coolant discharged, the larger the output value of the mist sensor, and the smaller the amount of coolant discharged, the smaller the output value of the mist sensor As such, the output value of the mist sensor is correlated with the amount of coolant discharged and thus can be the index value D(t).

(f) Specific Example 6 of the Index Value D(t)

As another example, the index value D(t) may be estimated based on an image obtained from a camera included in machine tool 100. The camera is provided so as to photograph work area AR in machine tool 100. An edge portion that appears in an image obtained from the camera increases as the amount of coolant discharged from discharge unit 125 increases. Namely, the amount of edge occupied in the image is correlated with the amount of coolant discharged. First obtaining unit 51 obtains the amount of edge occupied in the image, as the index value D(t).

(G2. Second Obtaining Unit 52)

Next, with reference to the aforementioned FIG. 7, a function of second obtaining unit 52 shown in FIG. 8 will be described.

Second obtaining unit 52 obtains an index value R(t) (second index value) indicating the amount of collected coolant that passes through filter 46 and is brought back to storage tank 10 per predetermined time. The length of the predetermined time may be determined in advance upon designing a program, etc., or may be arbitrarily set by the user. As an example, the length of the predetermined time is about 1 to 10 minutes.

The index value R(t) is data obtained by averaging or adding up, on a per certain section (unit time) basis, time-series data on the amount of coolant passing through filter 46. The index value R(t) can include various physical quantities correlated with the amount of coolant passing through filter 46. Typically, the index value R(t) is detected using various sensors provided on a more downstream side than filter 46. The following describes specific examples of the index value R(t).

(a) Specific Example 1 of the Index Value R(t)

As an example, the index value R(t) includes an output value of liquid level sensor 151 provided in collecting tank 11. Liquid level sensor 151 is provided inside collecting tank 11 and detects the height of the liquid level of coolant accumulated in collecting tank 11. The height may be represented by a distance from the bottom of collecting tank 11 to the liquid level of coolant or may be represented by a distance from the liquid level of coolant to liquid level sensor 151. The height of the liquid level is correlated with the amount of coolant having passed through filter 46. More specifically, the larger the amount of coolant passing through filter 46, the higher the liquid level, and the smaller the amount of coolant passing through filter 46, the lower the liquid level. As such, the amount of coolant passing through filter 46 is correlated with the output value of liquid level sensor 151 and thus can be the index value R(t).

(b) Specific Example 2 of the Index Value R(t)

As another example, the index value R(t) includes output to collecting pump 152. As described above, control unit 50 of machine tool 100 controls collecting pump 152 such that the output value of liquid level sensor 151 is constant. As a result, control unit 50 increases the amount of coolant pumped up by collecting pump 152 as the amount of coolant having passed through filter 46 increases In this case, the amount of coolant having passed through filter 46 is correlated with the output value to collecting pump 152.

Move specifically, collecting pump 152 has a motor (not shown). The amount of coolant collected by collecting pump 152 is adjusted based on the frequency of alternating current outputted to the motor (hereinafter, also referred to as "drive frequency"). Typically, control unit 50 increases the drive frequency as the amount of coolant passing through filter 46 increases, and reduces the drive frequency as the amount of coolant passing through filter 46 decreases. As such, the amount of coolant passing through filter 46 is correlated with the drive frequency of collecting pump 152. Hence, the drive frequency of collecting pump 152 can be the index value R(t).

(c) Specific Example 3 of the Index Value R(t)

As another example, the index value R(t) includes an output value of a flowmeter (not shown) included in machine tool 100. The flowmeter detects a flow rate of coolant having passed through filter 46. The flowmeter is provided, for example, in a passage present on a more downstream side than filter 46. Namely, coolant discharged from discharge unit 125 passes through filter 46 and then passes through the passage. As a result, the larger the amount of coolant passing through filter 46, the larger the output value of the flowmeter, and the smaller the amount of coolant passing through filter 46, the smaller the output value of the flowmeter. As such, the output value of the flowmeter is correlated with the amount of coolant passing through filter 46 and thus can be the index value R(t).

(G3. Determining Unit 54)

Figure 9:
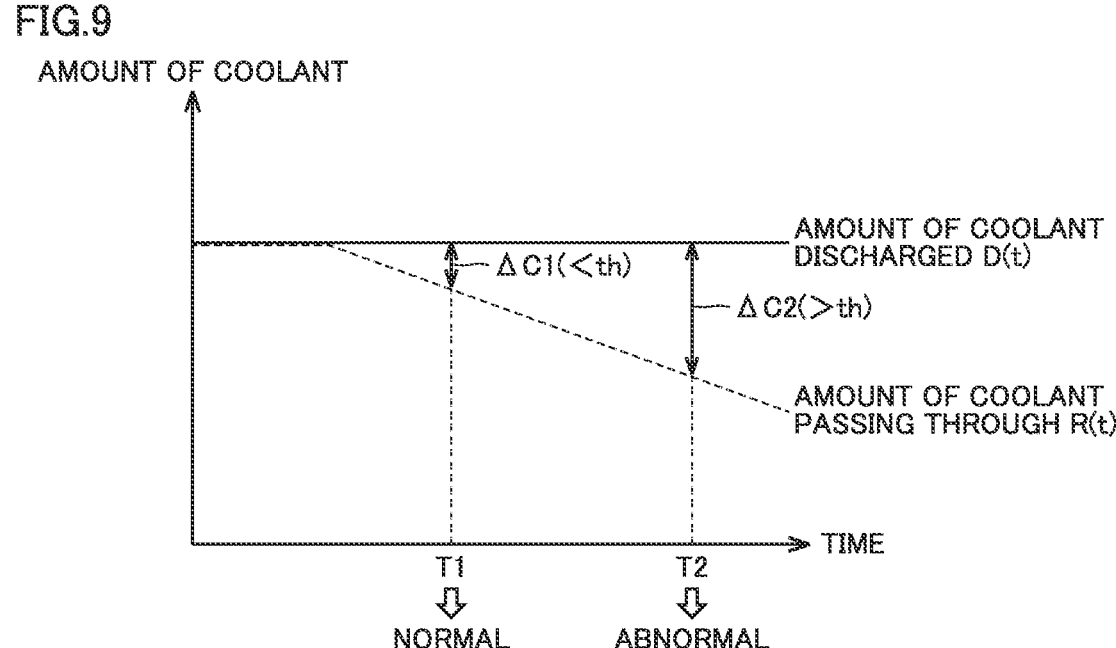
FIG. 9 is a diagram showing a transition of an index value D(t) and a transition of an index value R(t).

Next, with reference to FIG. 9, a function of determining unit 54 shown in FIG. 8 will be described. FIG. 9 is a diagram showing a transition of the index value D(t) obtained by first obtaining unit 51 and a transition of the index value R(t) obtained by second obtaining unit 52.

Determining unit 54 determines whether a result of comparison of the index value D(t) indicating the amount of coolant discharged with the index value R(t) after passing through filter 46 satisfies a predetermined abnormality condition. The abnormality condition is satisfied when the amount of coolant passing through filter 46 is small relative to the amount of coolant discharged. The abnormality condition is satisfied, for example, when a difference value of the index value D(t) from the index value R(t) exceeds a predetermined value th.

As an example, at time T1, determining unit 54 obtains a difference of an index value D(T1) from an index value D(T1), thereby calculating a difference value ΔC1 therebetween. The difference value ΔC1 is smaller than the predetermined value th, and thus, determining unit 54 determines that the predetermined abnormality condition is not satisfied.

As another example, at time T2, determining unit 54 obtains a difference of an index value D(T2) from an index value D(T2), thereby calculating a difference value ΔC2 therebetween. The difference value ΔC2 is larger than the predetermined value th, and thus, determining unit 54 determines that the predetermined abnormality condition is satisfied.

Note that although the above description is made of an example in which a determination as to whether the abnormality condition is satisfied is made by comparing index values D(t) and R(t) obtained at the same time, determining unit 54 may compare index values D(t) and R(t) obtained at different times. As an example, it takes some time before coolant passes through filter 46 after the coolant is discharged. Taking into account the time, determining unit 54 may compare an index value D(t) with an index value R(t+ΔT). The length of predetermined time ΔT may be determined in advance upon designing a program, etc., or may be arbitrarily set by the user.

In this case, determining unit 54 obtains a difference of the index value D(t+ΔT) from the index value D(t), and when the difference value is larger than the predetermined value th, determining unit 54 determines that the abnormality condition is satisfied. On the other hand, when the difference value is smaller than the predetermined value th, determining unit 54 determines that the abnormality condition is not satisfied.

(G4. Notifying Unit 56)

Figure 10:
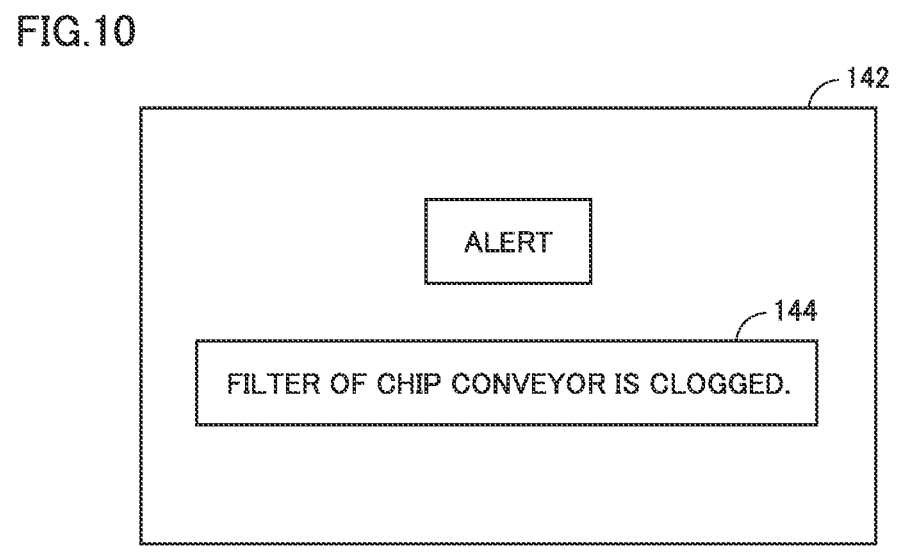

Next, with reference to FIG. 10, a function of notifying unit 56 shown in FIG. 8 will be described. FIG. 10 is a diagram showing an example of a mode of notification provided by notifying unit 56.

When aforementioned determining unit 54 determines that the abnormality condition is satisfied, notifying unit 56 notifies of occurrence of an abnormality in filter 46. As an example, notifying unit 56 displays an alert 144 on display 142 of control panel 140. Alert 144 includes a message saying that clogging has occurred in filter 46 of chip conveyor 150. By this, an operator can grasp that clogging has occurred in filter 46 of chip conveyor 150.

As another example, notifying unit 56 notifies of an alert indicating occurrence of clogging in filter 46, by sound such as a buzzer or voice. By this, an operator can notice an abnormality in filter 46 without looking at display 142.

As another example, notifying unit 56 transmits an alert indicating occurrence of clogging in filter 46 to another communication terminal by email, etc. By this, an operator or a manager present at a location away from machine tool 100 can notice an abnormality in filter 46.

<H. Hardware Configuration of Control Unit 50>

Figure 11:
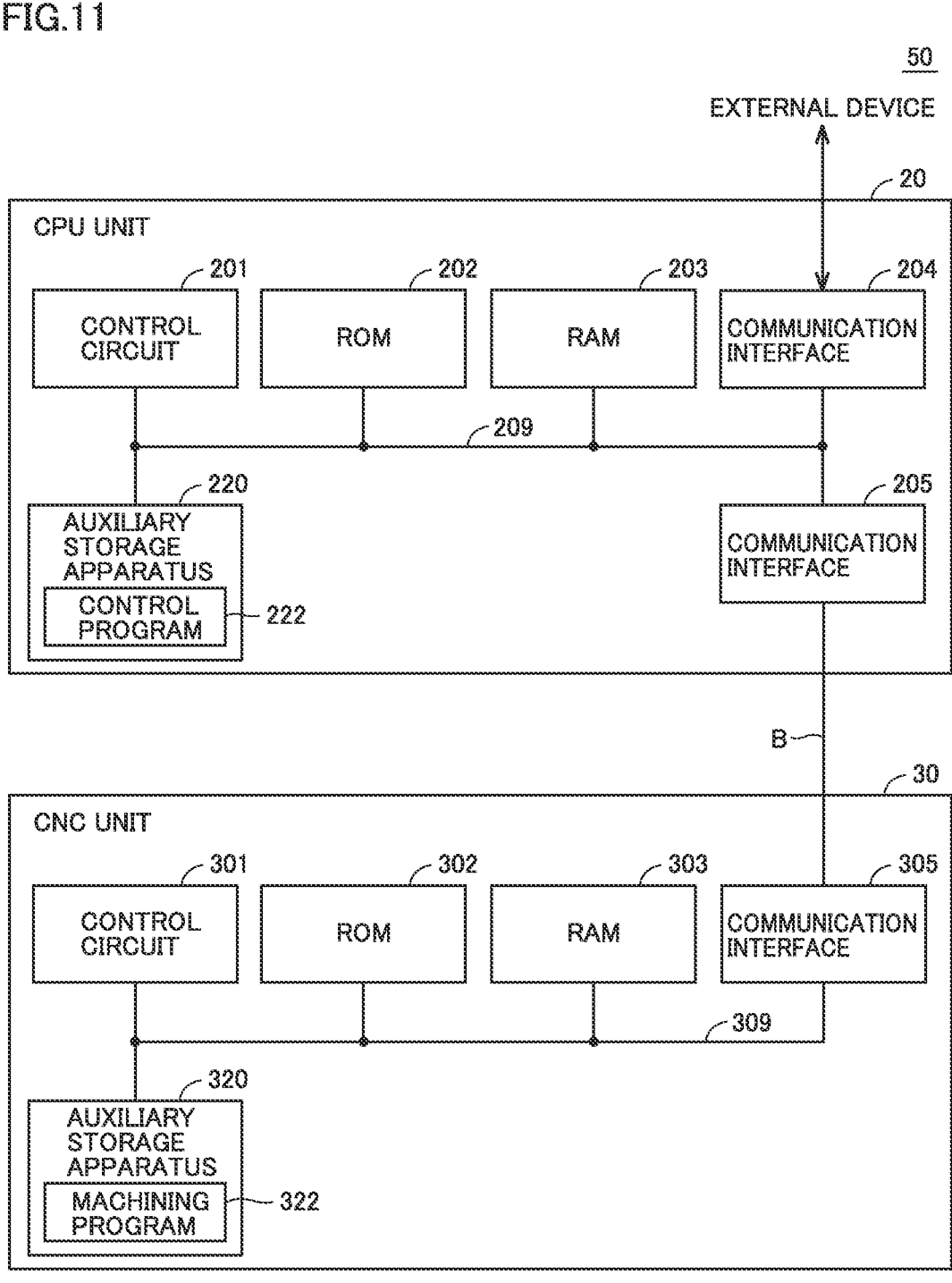
FIG. 11 is a diagram showing an example of a hardware configuration of a control unit.

Next, with reference to FIG. 11, a hardware configuration of control unit 50 shown in FIG. 4 will be described FIG. 11 is a diagram showing an example of a hardware configuration of control unit 50.

As shown in FIG. 11, control unit 50 includes CPU unit 20 and CNC unit 30. CPU unit 20 and CNC unit 30 are connected to each other, for example, through communication path B.

The following describes a hardware configuration of CPU unit 20 and a hardware configuration of CNC unit 30 in turn.

(H1. Hardware Configuration of CPU Unit 20)

CPU unit 20 includes a control circuit 201, a read only memory (ROM) 202, a random access memory (RAM) 203, communication interfaces 204 and 205, and an auxiliary storage apparatus 220. These components are connected to an internal bus 209.

Control circuit 201 includes, for example, at least one integrated circuit. The integrated circuit can include, for example, at least one CPU, at least one graphics processing unit (GPU), at least one application specific integrated circuit (ASIC), at least one field programmable gate array (FPGA), or a combination thereof.

Control circuit 201 controls the operation of CPU unit 20 by executing various programs such as a control program 222. The control program 222 defines instructions for controlling various apparatuses in machine tool 100. Based on reception of an instruction to execute control program 222, control circuit 201 reads control program 222 into RAM 203 from auxiliary storage apparatus 220 or ROM 202. RAM 203 functions as a working memory and temporarily stores various types of data required to execute control program 222.

Communication interface 204 is an interface for implementing communication that uses a local area network (LAN) cable, a wireless LAN (WLAN), Bluetooth (registered trademark), or the like. As an example, CPU unit 20 implements communication with external devices such as discharge pump 109, valve 110, and collecting pump 152 through communication interface 305.

Communication interface 205 is an interface for implementing communication with various units connected to a fieldbus. Examples of the units connected to the fieldbus include CNC unit 30 and an I/O unit (not shown).

Auxiliary storage apparatus 220 is, for example, a storage medium such as a hard disk or a flash memory. Auxiliary storage apparatus 220 stores control program 222, etc. A storage location of control program 222 is not limited to auxiliary storage apparatus 220, and control program 222 may be stored in a storage area (e.g., a cache memory) of control circuit 201, ROM 202, RAM 203, an external device (e.g., a server), etc.

Note that control program 222 may be provided included in a part of any program, instead of being a single program. In this case, various processes according to the present embodiment are implemented in cooperation with any program. Even if the program is such a program that does not include some modules, it does not depart from the spirit of control program 222 according to the present embodiment. Furthermore, some or all of functions provided by control program 222 may be implemented by dedicated hardware. Furthermore, CPU unit 20 may be formed in a mode such as a so-called cloud service in which at least one server performs some of processes performed by control program 222.

(H2. Hardware Configuration of CPU Unit 20)

Subsequently, with reference to FIG. 11, a hardware configuration of CNC unit 30 will be described.

CNC unit 30 includes a control circuit 301, a ROM 302, a RAM 303, a communication interface 305, a communication interface 305, and an auxiliary storage apparatus 320. These components are connected to an internal bus 300.

Control circuit 301 includes, for example, at least one integrated circuit. The integrated circuit can include, for example, at least one CPU, at least one ASIC, at least one FPGA, or a combination thereof.

Control circuit 301 controls the operation of CNC unit 30 by executing various programs such as a machining program 322. The machining program 322 is a program for implementing machining of a workpiece. Based on reception of an instruction to execute machining program 322, control circuit 301 reads machining program 322 into RAM 303 from ROM 302. RAM 303 functions as a working memory and temporarily stores various types of data required to execute machining program 322.

Communication interface 305 is an interface for implementing communication that uses a LAN, a WLAN, Bluetooth, or the like. As an example, CNC unit 30 implements communication with CPU unit 20 through communication interface 305. In addition, CNC unit 30 implements communication with various drive units for machining of a workpiece (e.g., motor drivers 111R and 111X to 111Z) through communication interface 305 or other communication interfaces.

Auxiliary storage apparatus 320 is, for example, a storage medium such as a hard disk or a flash memory. Auxiliary storage apparatus 320 stores machining program 322, etc. A storage location of machining program 322 is not limited to auxiliary storage apparatus 320, and machining program 322 may be stored in a storage area (e.g., a cache memory) of control circuit 301, ROM 302, RAM 303, an external device (e.g., a server), etc.

<I. Flowchart>

Figure 12:
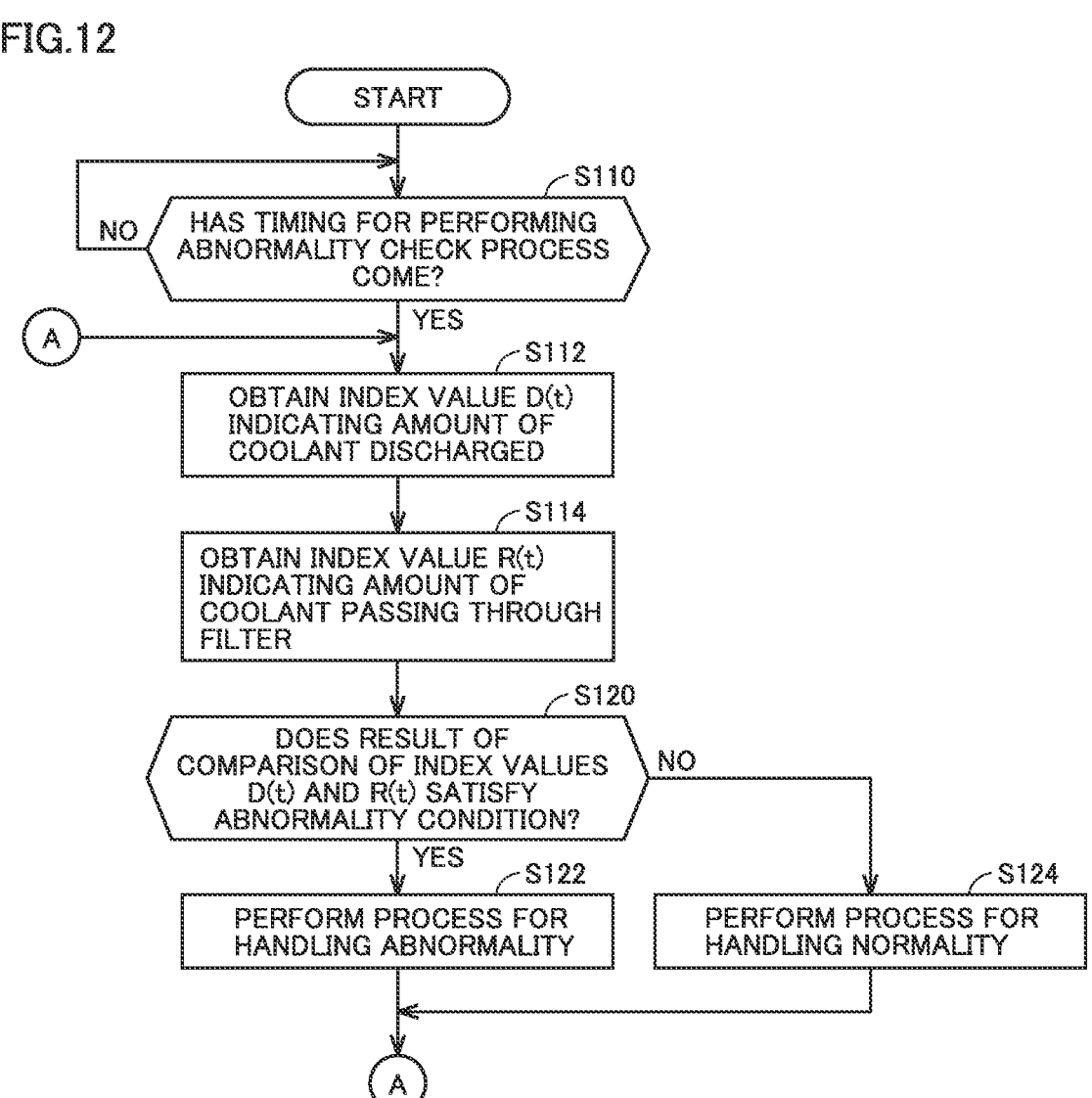
FIG. 12 is a flowchart showing some of processes performed by the machine tool.

Next, with reference to FIG. 12, a control structure of machine tool 100 will be described. FIG. 12 is a flowchart showing some of processes performed by machine tool 100.

The processes shown in FIG. 12 are implemented by control unit 50 of machine tool 100 executing aforementioned control program 222. In another aspect, some or all of the processes may be performed by a circuit element or other hardware.

In step S110, control unit 50 determines whether timing for performing an abnormality check process related to clogging of filter 46 has come.

As an example, the timing for performing an abnormality check process is one timing at which discharge of coolant from discharge unit 125 is performed. A determination as to whether discharge of coolant is performed is made, for example, based on control program 222 (see FIG. 11). Control program 222 includes, for example, various instruction codes related to drive of discharge unit 125. The instruction codes include an instruction code for specifying the on or off of discharge of coolant from discharge unit 125, etc. Based on the fact that a specific instruction code indicating that discharge unit 125 is being driven is executed, control unit 50 determines that coolant is being discharged, and determines that timing for performing an abnormality check process has come.

If control unit 50 determines that timing for performing an abnormality check process related to clogging of filter 46 has come (YES in step S110), then control unit 50 switches the control to step S112. If not (NO in step S110), then control unit 50 performs the process in step S110 again.

In step S112, control unit 50 functions as first obtaining unit 51 (see FIG. 8) and obtains the aforementioned index value D(t). The index value D(t) indicates the amount of coolant discharged from discharge unit 125 per predetermined time. The index value D(t) is as described above and thus description thereof is not repeated.

In step S114, control unit 50 functions as second obtaining unit 52 (see FIG. 8) and obtains the aforementioned index value R(t). The index value R(t) indicates the amount of collected coolant that passes through filter 46 and is brought back to storage tank 10 per predetermined time. The index value R(t) is as described above and thus description thereof is not repeated.

In step S120, control unit 50 functions as aforementioned determining unit 54 (see FIG. 8) and determines whether a predetermined abnormality condition is satisfied, by comparing the index value D(t) obtained in step S112 with the index value R(t) obtained in step S114. As an example, control unit 50 obtains a difference of the index value R(t) from the index value D(t), and when the difference value exceeds a predetermined value, control unit 50 determines that the predetermined abnormality condition is satisfied. If control unit 50 determines that the predetermined abnormality condition is satisfied (YES in step S120), then control unit 50 switches the control to step S122. If not (NO in step S120), then control unit 50 switches the control to step S124.

In step S122, control unit 50 functions as aforementioned notifying unit 56 (see FIG. 8) and notifies of occurrence of clogging of filter 46.

In step S124, control unit 50 functions as aforementioned notifying unit 56 (see FIG. 8) and notifies of the fact that filter 46 is functioning normally. Note that the process in step S124 may not be performed.

After performing step S122 and S124, control unit 50 brings the control back to step S112. The processes shown in FIG. 12 are stopped, for example, when a user's stop operation is received or based on the fact that machining is finished.

The presently disclosed embodiment is to be considered in all respects as illustrative and not restrictive. The scope of the present invention is indicated by the claims rather than the foregoing description, and all changes which come within the meaning and range of equivalency of the claims are therefore intended to be embraced therein.

REFERENCE SIGNS LIST

10: storage tank, 11: collecting tank, 12: conveying apparatus, 20: CPU unit, 21: cover body, 22, horizontal unit, 23: chip receiving unit, 24: connection opening, 26: rising unit, 27: chip draining unit, 28: coolant draining unit, 30: CNC unit, 34: endless chain, 35: chip conveying unit, 37: drive sprocket, 38 driven sprocket, 40: filtering mechanism, 46: filter, 47: internal space, 50: control unit, 51: first obtaining unit, 52: second obtaining unit, 54: determining unit, 56: notifying unit, 100: machine tool, 109: discharge pump, 110 valve, 111A, 111R, 111X, 111Y, 111Z motor driver, 112A, 112R, 112X, 112Y, 112Z: motor, 113: moving body, 125: discharge unit, 125A, 125B, 125C: discharge mechanism, 130: cover, 131: spindle head, 132: main spindle, 133: housing, 134: tool, 136: table. 140: control panel, 142: display, 144: alert. 150 chip conveyor, 151: liquid level sensor, 152: collecting pump, 201, 301, control circuit, 202, 302: ROM, 203, 303: RAM, 204, 205, 305: communication interface, 209, 309: internal bus. 220, 320: auxiliary storage apparatus, 222: control program, and 322: machining program.

The invention claimed is:

1. A machine tool that can machine a workpiece, the machine tool comprising:

a storage tank that stores coolant;

a discharge unit that discharges the coolant stored in the storage tank toward chips resulting from the machining of the workpiece;

a filter that removes the chips from the coolant having been discharged toward the chips;

a collecting pump that brings the coolant having passed through the filter back to the storage tank;

a first obtaining unit that obtains a first index value indicating an amount of the coolant discharged from the discharge unit per predetermined time;

a second obtaining unit that obtains a second index value indicating an amount of the coolant that passes through the filter and is brought back to the storage tank per the predetermined time; and a notifying unit that notifies of an abnormality in the filter when a result of comparison of the first index value with the second index value satisfies a predetermined abnormality condition.

2. The machine tool according to claim 1, further comprising a display unit, wherein the notifying unit displays, on the display unit, an alert indicating occurrence of clogging of the filter with the chips.

3. The machine tool according to claim 1, wherein the predetermined abnormality condition is satisfied when a difference value of the first index value from the second index value exceeds a predetermined value.

4. The machine tool according to claim 1, further comprising a collecting tank that receives the coolant having passed through the filter.

5. The machine tool according to claim 4, wherein the discharge unit includes:

a coolant nozzle; and a discharge pump that sends the coolant to the coolant nozzle from the storage tank, and the collecting pump sends the coolant from the collecting tank to the storage tank.

6. The machine tool according to claim 5, wherein the first index value includes a drive frequency of a motor for driving the discharge pump, and the second index value includes a drive frequency of a motor for driving the collecting pump.

7. A control method for a machine tool that can machine a workpiece, wherein the machine tool includes:

a storage tank that stores coolant;

a discharge unit that discharges the coolant stored in the storage tank toward chips resulting from the machining of the workpiece;

a filter that removes the chips from the coolant having been discharged toward the chips; and a collecting pump that brings the coolant having passed through the filter back to the storage tank, and the control method comprises:

obtaining a first index value indicating an amount of the coolant discharged from the discharge unit per predetermined time;

obtaining a second index value indicating an amount of the coolant that passes through the filter and is brought back to the storage tank per the predetermined time; and notifying of an abnormality in the filter when a result of comparison of the first index value with the second index value satisfies a predetermined abnormality condition.

* * * * *